US010399661B2

(12) United States Patent
Lampe et al.

(10) Patent No.: US 10,399,661 B2
(45) Date of Patent: Sep. 3, 2019

(54) SYSTEM FOR MOVING LOADS AND CARGO HOLD

(71) Applicants: Airbus Operations GmbH, Hamburg (DE); Airbus Operations SAS, Toulouse (FR); Airbus SAS, Blagnac (FR)

(72) Inventors: Dietrich Lampe, Hamburg (DE); Kai Christensen, Hamburg (DE); Knut Niemeck, Hamburg (DE); Claude Cuiller, Castelnau d'Estretefonds (FR); Pierre-Eric Dereux, Colomiers (FR); Frank Feest, Toulouse (FR); Kathryn Waidelich, Beauzelle (FR); Hyung Jo Kim, Colomiers (FR)

(73) Assignees: AIRBUS OPERATIONS GMBH, Hamburg (DE); AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 560 days.

(21) Appl. No.: 15/292,375

(22) Filed: Oct. 13, 2016

(65) Prior Publication Data
US 2017/0106967 A1    Apr. 20, 2017

(30) Foreign Application Priority Data
Oct. 14, 2015 (EP) .................................. 15189715

(51) Int. Cl.
*B64C 1/20* (2006.01)
*B64C 1/22* (2006.01)
(Continued)

(52) U.S. Cl.
CPC .................. *B64C 1/22* (2013.01); *B64C 1/20* (2013.01); *B64D 9/00* (2013.01); *B65G 25/04* (2013.01); *B64D 2009/006* (2013.01)

(58) Field of Classification Search
CPC ....... B64C 1/20; B64C 1/22; B64D 2009/006; B64D 9/003; B64D 9/00
(Continued)

(56) References Cited

U.S. PATENT DOCUMENTS 3,262,588 A * 7/1966 Davidson .................. B60P 1/52
 244/137.1
3,390,752 A * 7/1968 Davidson .................. B60P 1/36
 193/35 R
(Continued)

FOREIGN PATENT DOCUMENTS

CA 2985289 A1 * 7/2018 ............... B64D 9/00
DE 2735737 A1 2/1979
(Continued)

OTHER PUBLICATIONS

European Search Report, Extended European Search Report for European Patent Application No. 15189715.4 dated Mar. 23, 2016.
(Continued)

*Primary Examiner* — Chrisopher P Ellis
(74) *Attorney, Agent, or Firm* — Lorenz & Kopf LLP

(57) ABSTRACT

A system for moving loads comprises a cargo hold floor, at least one row of rollers integrated into the floor, at least one guide rail in the floor and extending parallel to the at least one row of rollers, and a least one transport vehicle. The vehicle is received in the guide rail and movable along the guide rail and comprises at least one connecting element which is movable between first and second operating positions wherein the connecting element, in its first operating position, is arranged such that the vehicle is positionable under a load deposited onto the at least one row of rollers and, in its second operating position, is arranged such that it interacts with the load so as to connect the load to the vehicle
(Continued)

such that the load is entrained by the vehicle when the vehicle is moved along the guide rail.

15 Claims, 3 Drawing Sheets

(51) Int. Cl.
  *B64D 9/00* (2006.01)
  *B65G 25/04* (2006.01)
(58) Field of Classification Search
  USPC .................................................. 244/137.1
  See application file for complete search history.

(56) References Cited

U.S. PATENT DOCUMENTS

| | | | | |
|---|---|---|---|---|
| 3,612,316 A * | 10/1971 | Baldwin | ............... | B60P 1/38 414/499 |
| 4,000,870 A * | 1/1977 | Davies | ............... | B64C 1/20 410/92 |
| 4,170,292 A | 10/1979 | Lang | | |
| 4,235,399 A * | 11/1980 | Shorey | ............... | B64C 1/22 14/71.1 |
| 5,184,366 A * | 2/1993 | Rawdon | ............... | B64C 1/22 14/71.5 |
| 9,284,130 B1 * | 3/2016 | Himmelmann | ........ | B65G 43/00 |
| 2003/0057326 A1 * | 3/2003 | Medina | ............... | B64D 9/00 244/137.1 |
| 2005/0224645 A1 * | 10/2005 | Huber | ............... | B64C 1/20 244/118.1 |
| 2007/0095978 A1 * | 5/2007 | Oetken | ............... | B64C 1/20 244/118.1 |
| 2009/0304482 A1 * | 12/2009 | Sanford | ............... | B64D 9/00 414/495 |
| 2010/0200695 A1 * | 8/2010 | Tsakiris | ............... | B64C 1/20 244/118.1 |
| 2010/0230230 A1 * | 9/2010 | Huber | ............... | B64D 9/00 193/35 R |
| 2012/0061511 A1 * | 3/2012 | Huber | ............... | B64C 1/20 244/118.1 |
| 2012/0312926 A1 * | 12/2012 | Holzner | ............... | B64D 9/00 244/137.1 |
| 2014/0255137 A1 | 9/2014 | Haertel et al. | | |
| 2016/0001870 A1 * | 1/2016 | Moradians | ............. | B64D 9/003 244/118.1 |
| 2016/0101859 A1 * | 4/2016 | Himmelmann | ........... | B64D 9/00 406/88 |
| 2016/0101861 A1 * | 4/2016 | Himmelmann | ........... | B64C 1/20 406/88 |
| 2016/0101864 A1 * | 4/2016 | Kuppan | ................ | B60P 7/0892 410/121 |
| 2016/0194082 A1 * | 7/2016 | Himmelmann | ........... | B60P 7/13 244/118.1 |
| 2017/0313423 A1 * | 11/2017 | Schoen | ................ | B64D 9/003 |
| 2018/0056848 A1 * | 3/2018 | Koehler | ............. | B65G 13/065 |
| 2018/0290724 A1 * | 10/2018 | Nowarre | ............... | B64C 1/20 |

FOREIGN PATENT DOCUMENTS

| | | | | |
|---|---|---|---|---|
| EP | 1527993 B1 | 2/2009 | | |
| EP | 2774849 A2 | 9/2014 | | |
| GB | 2450237 A | * 12/2008 | ............. | B64C 1/20 |
| WO | 2014049590 A1 | 4/2014 | | |

OTHER PUBLICATIONS

European Patent Office, Communication pursuant to Article 94(3) EPC for Application No. 15 189 715.4-1755, dated Oct. 19, 2017.

* cited by examiner

SYSTEM FOR MOVING LOADS AND CARGO HOLD

CROSS-REFERENCE TO RELATED APPLICATION

This application claims priority to European Patent Application No. 15189715.4, filed Oct. 14, 2015, which is incorporated herein by reference in its entirety.

TECHNICAL FIELD

The embodiments described herein relate to a system for moving loads which is suitable, in particular, for use in a cargo hold of an aircraft. The invention also relates to a cargo hold which is equipped with a system of this kind.

BACKGROUND

Loads which are to be transported in cargo or passenger aircraft are usually deposited in standardized containers or on standardized pallets, so-called "unit load devices" (ULD's). In order to be able to move the ULD's about within the cargo hold of the aircraft, roller tracks which, depending upon their configuration, allow movement of the ULD's in a direction-dependent or non-direction-dependent manner, are usually integrated into a floor of the cargo hold. A cargo hold equipped with roller tracks of this kind is described, for example, in EP 1 527 993 B1. The ULD's can be moved about manually on the roller tracks. As an alternative to this, an electric drive system with power drive units (PDU's), which system makes it possible to move the ULD's automatically within the cargo hold, may be provided in or alongside the roller tracks.

EP 2 774 849 A1 and US 2014/0255137 A1 disclose a system for moving loads which comprises a cargo compartment floor into which there is integrated at least one row of rollers which permits displacement of a load in a direction parallel to a surface of said cargo compartment floor. The system also comprises a transport vehicle which comprises a drive system and also a platform which is movable between a first operating position and a second operating position. In its first operating position, the platform is arranged in such a way that the transport vehicle is positionable under a load which is supported on the row of rollers integrated into the cargo compartment floor. In its second operating position, the platform is arranged in such a way that the load is entrained when a movement of the transport vehicle occurs in a direction parallel to the surface of the cargo compartment floor, and is displaced on the row of rollers integrated into the cargo compartment floor.

SUMMARY

An exemplary embodiment of the invention is directed to the object to provide a cost effective, lightweight system for moving loads which is suitable, in particular, for use in a cargo hold of an aircraft and which makes it possible, when the cargo hold is being loaded or unloaded, to move loads within the cargo hold in a convenient and standardized manner. Further, an exemplary embodiment of the invention is directed at the object to indicate a cargo hold which is equipped with a system of this kind.

This object is achieved by a system for moving loads which has the features of claim 1 and a cargo hold which has the features of claim 14.

A system for moving loads which is suitable, in particular, for use in a cargo hold of a means of transport, such as an aircraft for example, but which can also be used in a stationary storage space, such as a storage building for example, comprises a cargo hold floor. The cargo hold floor may consist of any suitable material, for example a metal or a plastic material. The loads in question may be standardized containers or standardized pallets, so-called ULD's, but may also be any other loads.

The system further comprises at least one row of rollers including a plurality of rollers which are integrated into the cargo hold floor one behind another. The at least one row of rollers may be adapted to allow a load to be moved in a direction parallel to the surface of the cargo hold floor. The rollers of the at least one row of rollers may have any desired shape, such as a cylindrical shape or a spherical shape for example, but are each mounted so as to be rotatable in such a way that a load which is deposited on the rollers can be moved in a direction parallel to the surface of the cargo hold floor. The rollers of the at least one row of rollers are preferably so dimensioned that a load which is deposited on the rollers is held at a sufficient distance from the surface of the cargo hold floor to enable the load to be moved parallel to the surface of the cargo hold floor without friction.

Furthermore, at least one guide rail is provided in the cargo hold floor. The guide rail extends substantially parallel to the at least one row of rollers. In general, both the row of rollers and the guide rail may have any desired curved or straight shape. However, in particular in case the system for moving loads should be used in an aircraft, the at least one row of rollers and the at least one guide rail preferably extend substantially straight in order to allow a straight movement of the load substantially parallel to the at least one row of rollers and the at least one guide rail. In a preferred embodiment, the at least one guide rail is defined by two adjacent substantially parallel roller tracks, i.e. the guide rail is defined between sidewalls of the two adjacent roller tracks.

The system for moving loads further comprises at least one transport vehicle which is removably received in the guide rail and movable along the guide rail. The transport vehicle can thus be inserted in the guide rail for loading or unloading a cargo hold equipped with the system for moving loads, and be taken out of the guide rail again after being used.

The transport vehicle allows convenient positioning of loads within a cargo hold equipped with the system, so that rapid loading or unloading of said cargo hold is made possible. Furthermore, a cargo hold equipped with the system for moving loads no longer has to be equipped with driven roller tracks which are integrated into the floor of the cargo hold over a large area. On the contrary, for the purpose of loading or unloading the cargo hold, the transport vehicle may merely be inserted in the guide rail integrated into the cargo hold floor and used for transporting the loads to the desired position within the cargo hold. After being used during the loading and unloading operation, the transport vehicle can be taken out of the guide rail and removed from the cargo hold. As a result, the unladen weight of the cargo hold can be reduced, which makes it possible, in advantageous manner, to increase its useful load. The guide rail provides for a guided and hence standardized, quick and reliable movement of the transport vehicle and hence the loads within the cargo hold. In addition, due to the presence of the guide rail, also a transport vehicle having a certain total height can still be positioned under the loads deposited onto the row of rollers. This increases the design flexibility for the transport vehicle which thus can be optimized with respect to weight, technical functionality and costs.

The transport vehicle comprises at least one connecting element which is movable between a first operating position and a second operating position. Preferably, the at least one connecting element is movable between its first operating position and its second operating position in a direction substantially perpendicularly to the surface of the cargo hold floor. In its first operating position, the at least one connecting element is arranged in such a way that the transport vehicle which is received in the guide rail is positionable under a load deposited onto the at least one row of rollers. In other words, when the connecting element is arranged in its first operating position, the connecting element does not significantly protrude from the guide rail beyond the surface of the cargo hold floor, but, on the contrary, is arranged in such a way that it is located below a plane defined by an upper surface of the rollers of the at least one row of rollers which serves as a carrier surface for the loads. As a result, the transport vehicle which is received in a guide rail can be positioned under a load which is deposited onto the at least one row of rollers.

In its second operating position, on the other hand, the connecting element is arranged in such a way that it is adapted to interact with the load so as to connect the load to the transport vehicle. In its second operating position, the connecting element of the transport vehicle consequently protrudes from the guide rail and is thus brought into a position for interacting with the load. By means of the interaction of the connecting element of the transport vehicle with the load, the load is connected to the transport vehicle in such a mat that the load, which is still supported on the rollers of the at least one row of rollers, is entrained by the transport vehicle when the transport vehicle is moved along the guide rail. This makes it possible for the load to be guided with the transport vehicle when the latter moves along the guide rail, and to thus be likewise moved along the guide rail parallel to the surface of the cargo compartment floor.

Since the load is still supported on the rollers of the at least one row of rollers even upon being moved within the cargo hold by means of the transport vehicle, the transport vehicle does not need to be capable of carrying the weight of the load. Consequently, the transport vehicle can be embodied in a distinctly lighter and more cost-effective way than a transport vehicle which has to bear the full weight of a load when the latter is displaced.

Basically, the at least one connecting element of the transport vehicle may, for example, comprise a press plate which may be adapted to press, in the second operating position of the connecting element, against a bottom surface of the load with a contact pressure such that the frictional forces that occur between the connecting element of the transport vehicle and the base plate of the load in the process are sufficiently great to guarantee that the load is entrained when a movement of the transport vehicle occurs in a direction parallel to the surface of the cargo compartment floor along the guide rail, and is displaced on the row of rollers together with the transport vehicle. Such a configuration of the at least one connecting element has the advantage that the transport vehicle then can be used universally and it is possible to dispense with special adaptation of the loads which are to be displaced with the aid of said transport vehicle.

Preferably, however, the connecting element of the transport vehicle comprises a first portion which, in the second operating position of the connecting element, extends from a top surface of the transport vehicle in a direction of the load so as to interact with a side wall surface of the load and to apply a pushing force onto the side wall surface of the load when the transport vehicle is moved along the guide rail. The first portion of the connecting element may, for example, extend from the top surface of the transport vehicle in a vertical direction. The first portion of the connecting element then is particularly suitable to interact with a side wall surface of the load which extends substantially parallel to the first portion of the connecting element. Alternatively or additionally thereto, the first portion of the connecting element may be plate-shaped and thus particularly suitable to interact with planar portion of an outer surface of a sidewall of the load. As a result of the interaction of the first portion of the connecting element with the side wall surface of the load it is possible to ensure that the load is entrained when a movement of the transport vehicle occurs in a direction parallel to the surface of the cargo compartment floor along the guide rail, and is accordingly displaced on the at least one row of rollers even in case the load is wet and hence slippery.

In a preferred embodiment of the system for moving loads, the connecting element of the transport vehicle may comprise a second portion which extends substantially perpendicular to the first portion so that the first and the second portion of the connecting element, in the second operating position of the connecting element, are adapted to grip around a lower rim of the load. It is, however, also conceivable to provide the connecting element with a second portion which extends at an angle relative to the first portion of the connecting element that is adapted to an inclination of a surface of the lower rim of the load which, in the second operating position of the connecting element, faces the second portion of the connecting element.

The system for moving loads may further comprise a sensor which is adapted to detect whether there is free space in a region above the transport vehicle which allows the connecting element to be moved from its first operating position into its second operating position. A control unit of the system may be adapted to control the movement of the connecting element between its first operating position and its second operating position in dependence of signals provided by the sensor. The detection of the presence of free space in the region above the transport vehicle prevents that the connecting element is inadvertently moved from its first operating position into its second operating position, for example while the transport vehicle in its entirety still is positioned below the load. Damages to the connecting element can thus be avoided.

Basically, the transport vehicle may comprise only one connecting element. It is, however, also conceivable to equip the transport vehicle with a first connecting element and a second connecting element. The first and the second connecting element may be arranged in the region of opposing edges of the transport vehicle. In particular, the first and the second connecting element may be arranged in the region of a front edge and a rear edge, respectively, of the transport vehicle with respect to the direction of movement of the transport vehicle along the guide rail. The two connecting elements then may be used to push the load in opposite directions along the guide rail.

The transport vehicle may also comprise a braking element which is movable between a first operating position and a second operating position. In its first operating position, the braking element may be arranged in such a way that the transport vehicle is positionable under a load deposited onto the row of rollers.

When the braking element is arranged in its first operating position, the braking element thus does not significantly protrude from the guide rail beyond the surface of the cargo hold floor, but, like the connecting element in its first operating position, is arranged in such a way that it is located below a plane defined by the upper surface of the rollers of the at least one row of rollers. As a result, the transport vehicle which is received in a guide rail can be positioned under the load without the braking element interacting with the load.

In its second operating position, on the other hand, the braking element may be arranged in such a way that it is adapted to interact with the load so as to counteract a movement of the load relative to the transport vehicle when the load is entrained by the transport vehicle. In its second operating position, the braking element consequently protrudes from the guide rail and is thus brought into a position for interacting with the load. By means of the interaction of the braking element of the transport vehicle with the load, the load is held in its position relative to the transport vehicle when the load is entrained by the transport vehicle.

For example, the braking element may comprise a friction pad which, in the second operating position of the braking element, is adapted to interact with a bottom surface of the load when the load is entrained by the transport vehicle. A friction pad has a low weight and reliably counteracts a movement of the load relative to the transport vehicle, when the load is entrained by the transport vehicle.

Basically, the transport vehicle may be movable manually along the guide rail, for example with the aid of rollers attached to an underside of the transport vehicle. As an alternative to this it is, however, also conceivably possible for the transport vehicle to be equipped with a suitable drive mechanism which allows automatic movement of the transport vehicles along the guide rail. For example, the drive mechanism may comprise an electric motor which is supplied with power by a suitable accumulator, such as a battery.

In a particularly preferred embodiment, the drive mechanism of the transport vehicle comprises a rack and pinion drive. A rack and pinion drive allows an energy efficient and reliable movement of the transport vehicle along the guide rail. In particular in case the transport vehicle is equipped with a drive mechanism comprising an electric motor, the rack and pinion drive may be used to effectively and efficiently convert a rotational motion of the electric motor into the desired linear motion of the transport vehicle along the guide rail.

The rack and pinion drive may comprise at least one pinion which is provided in the region of a side face of the transport vehicle. For example, the pinion may be coupled to the electric motor either directly or via a suitable gear mechanism. A driving force provided by the electric motor thus causes a rotational movement of the pinion. The pinion may interact with a rack provided in the guide rail. The guide rail then is used to mount the rack of the rack and pinion drive in a space saving manner.

The at least one pinion may be rotatable about an axis which extends substantially parallel to a side wall of the guide rail. The at least one pinion then is suitable to interact with a rack which is mounted to the side wall of the guide rail or formed integral with the sidewall of the guide rail.

The rack of the rack and pinion drive may comprise teeth which are adapted to interact with complementary teeth provided on the at least one pinion. Alternatively, the rack may be defined by slits cut into a side wall of the guide rail. This allows a particularly lightweight design of the rack.

In a particularly preferred embodiment of a system for moving loads, the rack and pinion drive comprises a pair of pinions, wherein one pinion is provided in the region of each one of opposing side faces of the transport vehicle. Each pinion may interact with a corresponding rack provided in the guide rail. A rack and pinion drive comprising a pair of pinions and a corresponding pair of racks is particularly suitable to ensure a smooth and reliable movement of the transport vehicle along the guide rail. In a preferred embodiment of the system for moving loads, each pinion is driven by an associated electric motor, either directly or via a suitable gear.

A cargo hold comprises an above-described system for moving loads.

The system for moving loads as described above and/or a cargo hold as described above is/are particularly suitable for use in an aircraft.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
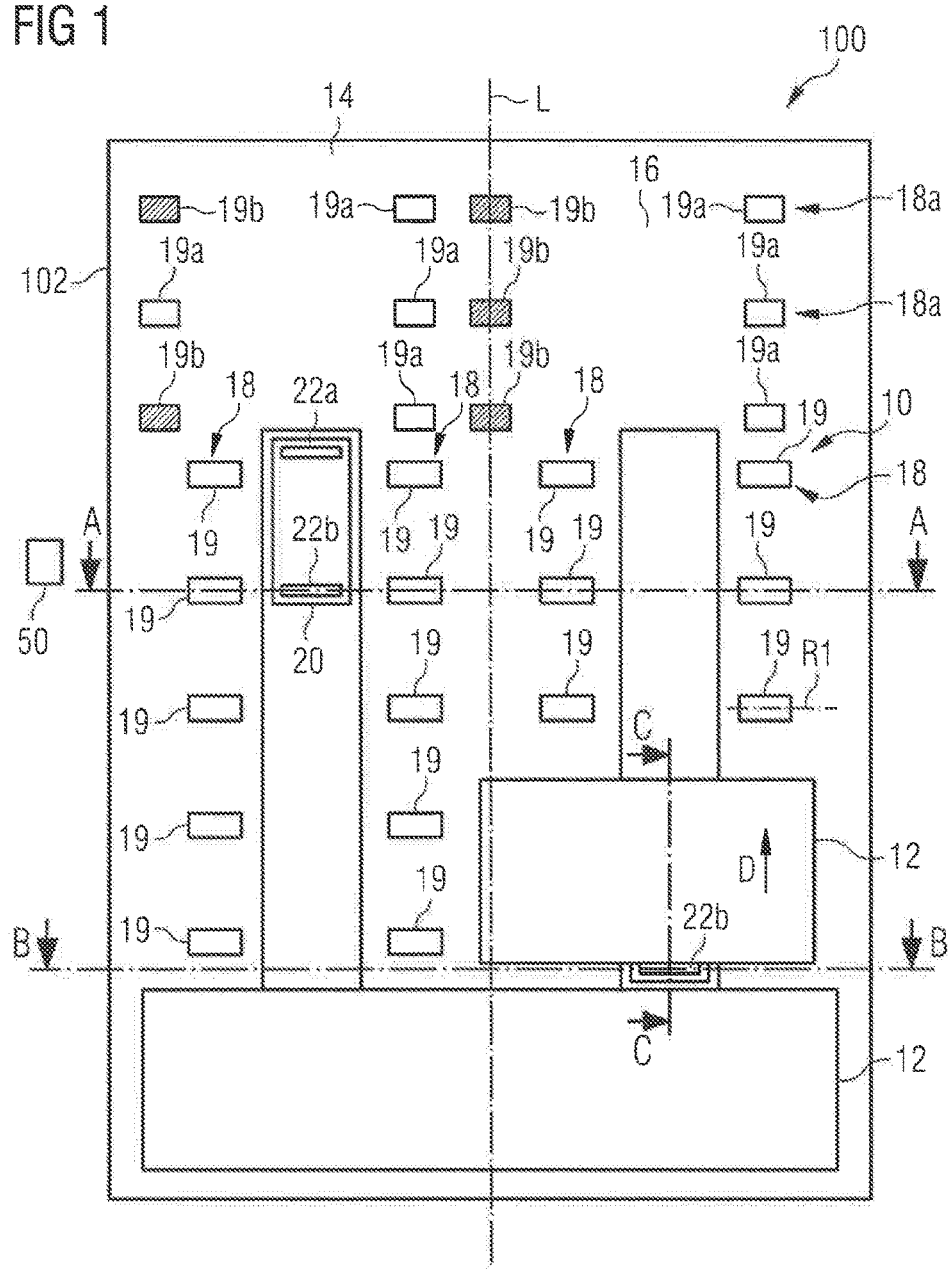
FIG. 1 shows a schematic top view of a cargo hold equipped with a system for moving loads.
Figure 3:
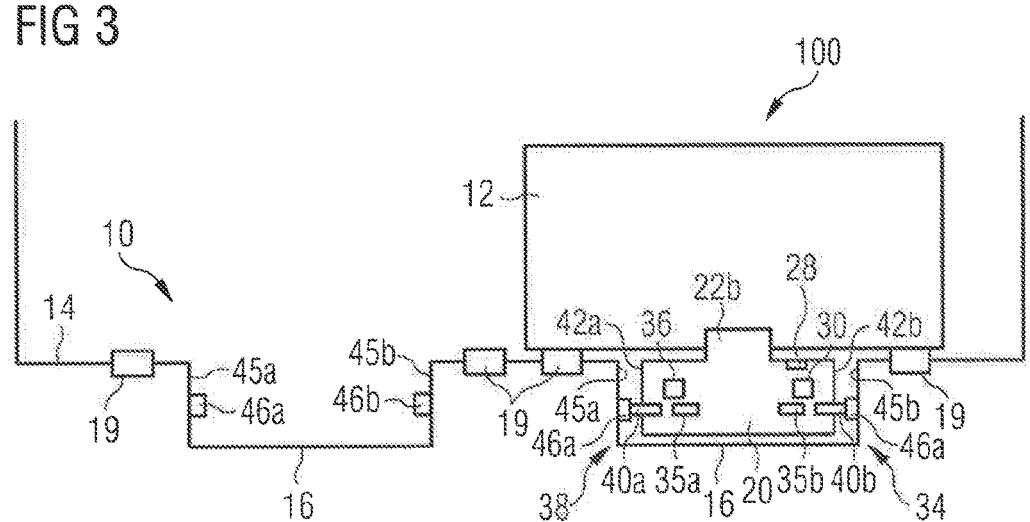
FIG. 3 shows a schematic sectional view of the cargo hold according to FIG. 1, along the line B-B in FIG. 1.

FIGS. 1, and 3 each show a cargo hold 100 which is equipped with a system 10 for moving loads 12. The cargo hold 100 in question is a cargo hold of a means of transport, in particular an aircraft. The system 10 for moving loads comprises a cargo hold floor 14 which has a mechanical load-bearing capacity which is adapted to the weight and shape of the loads 12 which are intended to be transported in the cargo hold 100. The loads 12 in question may be standardized containers or standardized pallets, that is to say ULD's, but may also be any other loads 12. Provided in the cargo hold floor 14 are two guide rails 16 which extend substantially parallel to one another, substantially parallel to a longitudinal axis L of the cargo hold 100 and hence substantially parallel to the direction of flight of the aircraft which is equipped with the cargo hold 100.

Each guide rail 16 extends substantially parallel to at east one row of rollers 18, wherein each row of rollers 18 includes a plurality of rollers 19 which are integrated into the cargo hold floor 14 one behind another. Specifically, in the preferred embodiment of a cargo hold 100 depicted in the drawings, each guide rail 16 extends between a pair of substantially parallel row of rollers 18 and in particular is defined by side walls of adjacent roller tracks including the rows of rollers 18. Like the guide rails 16, also the rows of rollers 18 extend substantially parallel to a longitudinal axis L of the cargo hold 100 and hence substantially parallel to the direction of flight of the aircraft which is equipped with the cargo hold 100. The rollers 19 of the rows of rollers 18 are circular-cylindrically shaped and have an axis of rotation R1 which extends substantially perpendicular to the guide rails 16.

The system 10 for moving loads 12 also comprises a plurality of transport vehicles 20 which are received in the guide rails 16 in a removable manner and can be moved along said guide rails 16. The transport vehicles 20 are inserted in the guide rails 16 for the purpose of loading or unloading the cargo hold 100. After being used during the loading or unloading operation, on the other hand, the transport vehicles 20 are taken out of the guide rails 16 again.

Figure 2:
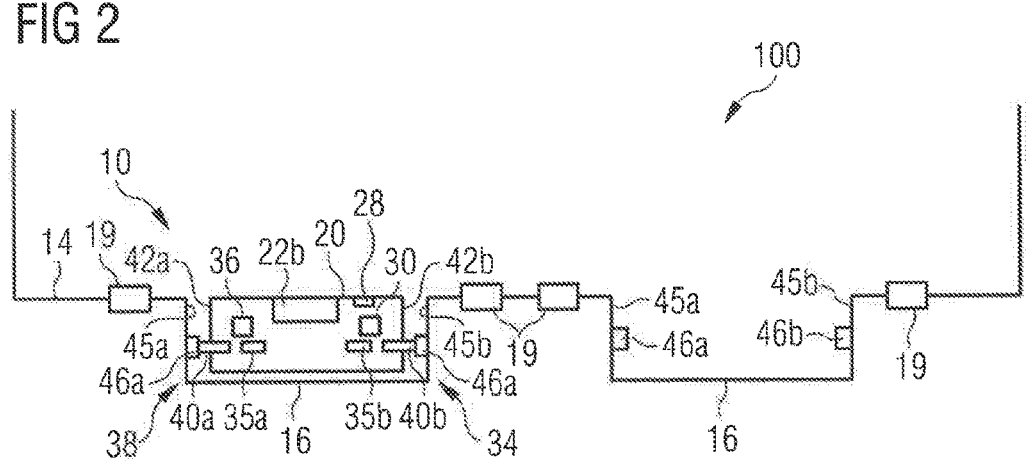
FIG. 2 shows a schematic sectional view of the cargo hold according to FIG. 1, along the line A-A in FIG. 1.

Each transport vehicle 20 comprises two connecting elements 22a, 22b each of which is movable between a first operating position and a second operating position. Each connecting element 22a, 22b is movable between its first operating position and its second operating position in a direction substantially perpendicularly to the surface of the cargo hold floor, FIG. 2 shows both connecting elements 22a, 22b of the transport vehicle 20 in their first operating position. To the contrary, in FIGS. 3 and 4 connecting element 22a still is in its first operating position, whereas, however, connecting element 22b is arranged in its second operating position. The first and the second connecting element 22a, 22b are arranged in the region of opposing edges of the transport vehicle 20. In particular, the first and the second connecting element 22a, 22b are arranged in the region of a front edge and a rear edge, respectively, of the transport vehicle 20 with respect to the direction of movement of the transport vehicle along the guide rail 16.

In their first operating position, the connecting elements 22a, 22b do not significantly protrude from the guide rail 16 beyond the surface of the cargo hold floor 14, but, on the contrary, are arranged in such a way that they are located below a plane defined by an upper surface of the rollers 19 of the roller tracks 18 which serves as a carrier surface for the load 12. As a result, the transport vehicle 20 which is received in a guide rail 16 can be positioned under a load 12 which is deposited onto the rows of rollers 18.

In their second operating position, the connecting elements 22a, 22b protrude from the guide rail 16 and are hence arranged in such a way that they are adapted to interact with the load 12 so as to connect the load 12 to the transport vehicle 20 in such a manner that the load 12, which is still supported on the rollers 19 of the roller tracks 18, is entrained by the transport vehicle 20 when the transport vehicle 20 is moved along the guide rail 16. This makes it possible for the load 12 to be guided with the transport vehicle 20 when the latter moves along the guide rail 16, and to thus be likewise moved along the guide rail 16 parallel to the surface of the cargo compartment floor 14 and parallel to the longitudinal axis L of the aircraft. Since the load 12 is still supported on the rollers 19 of the roller tracks 18 even upon being moved within the cargo hold 100 by means of the transport vehicle 20, the transport vehicle 20 does not need to be capable of carrying the weight of the load 12.

Figure 4:
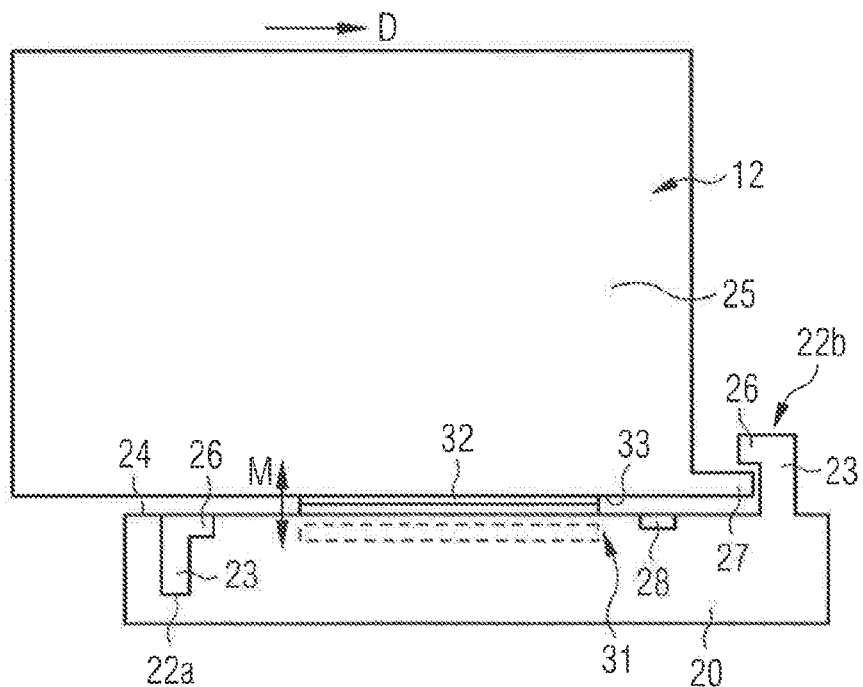
FIG. 4 shows a schematic sectional view of a detail of the cargo hold according to FIG. 1, along the line C-C in FIG. 1.

As becomes apparent from FIG. 4, each connecting element 22a, b comprises a substantially plate-shaped first portion 23 which, in the second operating position of the connecting element 22a, 22b, extends from a top surface 24 of the transport vehicle 20 vertically in a direction of the load 12 so as to interact with a side wall surface 25 of the load 12 and to apply a pushing force onto the side wall surface 25 of the load 12 when the transport vehicle 20 is moved along the guide rail 16 in a direction D indicated by respective arrows in FIGS. 1 and 4. Furthermore, each connecting element 22a, 22b comprises a second portion 26 which extends substantially perpendicular to the first portion 24 so that the first and the second portion 23, 26 of each connecting element 22a, 22b, in the second operating position of the connecting element 22a, 22b, are adapted to grip around a lower rim 27 of the load 12.

In case a particularly simple and lightweight design of the connecting elements 22a, 22b is desired or in case the loads 12 to be moved to not comprise a lower rim 27, it is, however, also conceivable to provide the transport vehicles 20 with connecting elements 22a, 22b having only a first portion 23 but no second portion 26. Furthermore, it is also conceivable to equip the transport vehicles 20 with only one connecting element. The presence of two connecting elements 22a, 22b which are arranged in the region of the front edge and the rear edge, respectively, of the transport vehicle 20 with respect to the direction of movement of the transport vehicle 20 along the guide rail 16, however, simplifies pushing loads 12 in opposite directions along the guide rail 16.

Each transport vehicle 20 further comprises a sensor 28 which is adapted to detect whether there is free space in a region above the transport vehicle 20 which allows the connecting elements 22a, 22b to be moved from their first operating position into their second operating position. A control unit 30 is adapted to control the movement of the connecting elements 22a, 22b between their first operating position and their second operating position in dependence of signals provided by the sensor 28.

Finally, each transport vehicle 20 comprises a braking element 31 with a friction pad 32 which is movable between a first operating position and a second operating position in the direction of an arrow M in FIG. 4. In its first operating position, which is shown in dotted lines in FIG. 4, the braking element 31 is arranged in such a way that the transport vehicle 20 is positionable under a load deposited onto the rows of rollers 18. When the braking element 31 is arranged in its first operating position, the braking element 31 thus does not significantly protrude from the guide rail 16 beyond the surface of the cargo hold floor 14, but, like the connecting elements 22b in their first operating position, is arranged in such a way that it is located below a plane defined by the upper surface of the rollers 19 of the rows of rollers 18. As a result, the transport vehicle 20 which is received in a guide rail 16 can be positioned under the load 12 without the braking element 31 interacting with the load 12.

In its second operating position, which is shown in continuous lines in FIG. 4, the braking element 31 is arranged in such a way that it is adapted to interact with the load 12 so as to counteract a movement of the load 12 relative to the transport vehicle 20 when the load 12 is entrained by the transport vehicle 20. In its second operating position depicted in FIG. 4, the braking element 31 consequently protrudes from the guide rail 16 and is thus brought into a position for interacting with the load 12. In particular, in its second operating position the friction pads 32 of the braking element 31 is adapted to interact with a bottom surface 33 of the load 12 when the load 12 is entrained by the transport vehicle 20. Thus, the load 12 is held in its position relative to the transport vehicle 20 when the load 12 is entrained by the transport vehicle 20.

As becomes apparent from FIG. 1, the guide rails 16 are arranged at a distance from one another which is adapted to the dimensions of the loads 1 be transported. In particular, the distance between the two adjacent guide rails 16 is an dimensioned that a large load 12, which extends over the entire width of the cargo hold 100, can be moved along the guide rails 16 with the aid of both transport vehicles 20 received within the guide rails 16, whereas a small load 12, which extends over only one half of the width of the cargo hold 100, can be moved along a guide rail 16 with the aid of only one transport vehicle 20.

Each transport vehicle 20 is equipped with a drive mechanism 34 for driving the transport vehicle 20 along the guide rail 16. The drive mechanism 34 comprises two electric motors 35a, 35b and an accumulator 36 for supplying the electric motors 35a, 35b with power.

Figure 5:
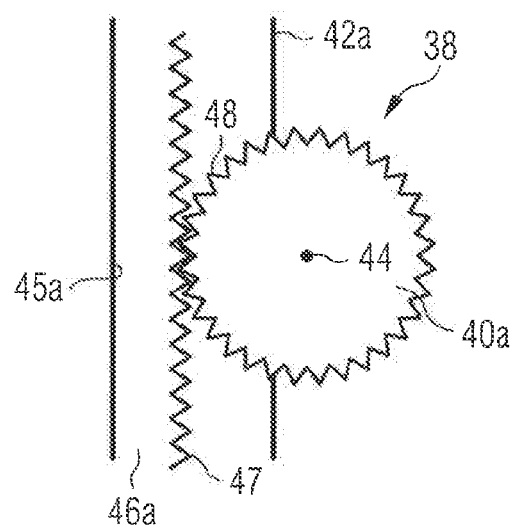
FIG. 5 shows a detail top view of a drive mechanism for driving a transport vehicle of the system for moving loads.

The drive mechanism 34 further comprises a rack and pinion drive 38 which is depicted in greater detail in the top view of FIG. 5. The rack and pinion drive 38 serves to effectively and efficiently convert a rotational motion of the electric motors 35 into the desired linear motion of the transport vehicle 20 along the guide rail 16 and comprises a pair of pinions 40a, 40b wherein one pinion 40a, 40b is provided in the region of each one of opposing side faces 42a, 42b of the transport vehicle 20 and wherein each pinion 40a, 40b is driven by one of the electric motors 35a, 35b. Each pinion 40a, 40b is coupled to its associated electric motor 35a, 35b via a suitable gear mechanism (not shown) and is rotatable about an axis 44 which extends substantially parallel to an adjacent side wall 45a, 45b of the guide rail 16. Thus, a driving force provided by the electric motors 35a, 35b causes a rotational movement of the pinions 40a, 40b.

Each pinion 40a, 40b of the rack and pinion drive 38 interacts with a corresponding rack 46a 46b which is provided in the guide rail 16 and extends along one of the sidewalls 45a, 45b of the guide rail 16. Each rack 46a, 46b is attached to a corresponding side wall 45a, 45b of the guide rail 16 in such a manner that teeth 47 provided on the rack 46a, 46b face in the direction of the transport vehicle 20 so as to interact with complementary teeth 48 provided on a corresponding pinion 40a, 40b provided in the region of a side face 42a, 42b of the transport vehicle 20. In an alternative embodiment which is not shown in the drawings, the racks 46a, 46b of the rack and pinion drive 38 are defined by slits cut into the sidewalls 45a, 45b of the guide rail 16.

The control unit 30 of the transport vehicles 20, besides controlling the movement of the connecting elements 22a, 22b between their first operating position and their second operating position, also controls the movement of the transport vehicle 20 along the guide rail 16. The system 10 for moving loads 12 also comprises a remote control device 50 (see FIG. 1) which is adapted to send control signals to a receiving apparatus of the control unit 30 of the transport vehicles 20. The remote control device 50 is adapted to transmit infrared signals. The receiving apparatus is therefore designed in a corresponding manner in the form of an infrared receiving apparatus.

As becomes apparent from FIG. 1, a plurality of additional roller tracks 18a are integrated into the cargo hold floor 14 in a partial region of the cargo hold 100 which is arranged adjacent to a door 102 of the cargo hold 100. As a result, the cargo hold 100 can be completely loaded, even if the transport vehicles 20 have to be taken out of the guide rails 16 towards the end of the loading operation before the guide rails 16 are covered by loads 12, or else it is not yet possible to position the transport vehicles 20 in the guide rails 16 at the start of the unloading operation because the guide rails 20 are still covered by loads 12. The additional roller tracks 18a are adapted to allow omnidirectional movement of the loads 12. This is accomplished by equipping the additional roller tracks 18a with spherical rollers 19a. Furthermore, in order to simplify movement of the loads 12, the additional roller tracks 18a comprise driven rollers 19b. As a result, it is not necessary to manually move the loads 12 also in the partial region of the cargo hold 100 which is equipped with the additional roller tracks 18a.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A system for moving loads, comprising:
   a cargo hold floor,
   at least one row of rollers including a plurality of rollers which are integrated into the cargo hold floor one behind another,
   at least one guide rail provided in the cargo hold floor and extending substantially parallel to the at least one row of rollers, and
   a least one transport vehicle removably received in the guide rail and movable along the guide rail and which comprises at least one connecting element which is movable between a first operating position and a second operating position, wherein the connecting element, in its first operating position, is arranged in such a way that the transport vehicle which is received in the guide rail is positionable under a load deposited onto the at least one row of rollers and, in its second operating position, is arranged in such a way that it is adapted to interact with the load so as to connect the load to the transport vehicle in such a manner that the load is entrained by the transport vehicle when the transport vehicle is moved along the guide rail.

2. The system for moving loads according to claim 1, wherein the connecting element of the transport vehicle comprises a first portion which, in the second operating position of the connecting element, extends from a top surface of the transport vehicle in a direction of the load so as to interact with a side wall surface of the load and to apply a pushing force onto the side wall surface of the load when the transport vehicle is moved along the guide rail.

3. The system for moving loads according to claim 2, wherein the connecting element of the transport vehicle comprises a second portion which extends substantially perpendicular to the first portion so that the first and the second portion of the connecting element, in the second operating position of the connecting element, are adapted to grip around a lower rim of the load.

4. The system for moving loads according to claim 1, further comprising:
   a sensor adapted to detect whether there is free space in a region above the transport vehicle which allows the connecting element to be moved from its first operating position into its second operating position, and
   a control unit adapted to control the movement of the connecting element between its first operating position and its second operating position in dependence of signals provided by the sensor.

5. The system for moving loads according to claim 1, wherein the transport vehicle comprises a first connecting element and a second connecting element, the first and the second connecting element being arranged in the region of opposing edges of the transport vehicle.

6. The system for moving loads according to claim 1, wherein the transport vehicle comprises braking element which is movable between a first operating position and a second operating position, wherein the braking element, in its first operating position, is arranged in such a way that the transport vehicle is positionable under a load deposited onto the row of rollers and, in its second operating position, is arranged in such a way that it is adapted to interact with the load so as to counteract a movement of the load relative to the transport vehicle, when the load is entrained by the transport vehicle.

7. The system for moving loads according to claim 6, wherein the braking element comprises a friction pad which, in the second operating position of the braking element is adapted to interact with a bottom surface of the load when the load is entrained by the transport vehicle.

8. The system for moving loads according to claim 1, wherein the transport vehicle comprises a drive mechanism for driving the transport vehicle along the guide rail, the drive mechanism in particular comprising at least one electric motor supplied with power from an accumulator.

9. The system for moving loads according to claim 8, wherein the drive mechanism comprises a rack and pinion drive.

10. The system for moving loads according to claim 9, wherein the rack and pinion drive comprises at least one pinion which is provided in the region of a side face of the transport vehicle and which interacts with a rack provided in the guide rail.

11. The system for moving loads according to claim 10, wherein the at least one pinion is rotatable around an axis which extends substantially parallel to a side wall of the guide rail.

12. The system for moving loads according to claim 10, wherein the rack comprises teeth or is defined by slits cut into a side wall of the guide rail.

13. The system for moving loads according to claim 9, wherein the rack and pinion drive comprises at least one pair of pinions provided in the region of opposing side faces of the transport vehicle, each pinion interacting with a rack provided in the guide rail, wherein each pinion preferably is driven by an associated electric motor.

14. A cargo hold comprising a system for moving loads according to claim 1.

15. Use of a system for moving loads according to claim 1 in an aircraft.

* * * * *